United States Patent [19]

Tyler

[11] 4,103,645
[45] Aug. 1, 1978

[54] WASTE BAG FOR ANIMALS

[76] Inventor: Harold E. Tyler, 3129 Flora St., Kansas City, Mo. 64109

[21] Appl. No.: 757,657

[22] Filed: Jan. 7, 1977

[51] Int. Cl.² ............................................. A01K 23/00
[52] U.S. Cl. ..................................................... 119/95
[58] Field of Search ............... 119/95, 143; 128/283, 128/295

[56] References Cited

U.S. PATENT DOCUMENTS

| 810,689 | 1/1906 | Way | 128/283 |
| 2,585,251 | 2/1952 | Kahlert | 119/95 |
| 3,090,356 | 5/1963 | Andrisani | 119/95 |
| 3,211,132 | 10/1965 | Hersh | 119/143 |
| 3,786,787 | 1/1974 | Weinberger | 119/95 |
| 3,792,687 | 2/1974 | Ehrman | 119/95 |
| 3,875,903 | 4/1975 | Sarvary | 119/95 |

*Primary Examiner*—Hugh R. Chamblee
*Attorney, Agent, or Firm*—Lowe, Kokjer, Kircher, Wharton & Bowman

[57] ABSTRACT

A disposable waste bag arrangement for small pets. The waste bag is attached to the body of the animal either by means of trousers or a harness which is worn by the animal. The bags are connected with mounting pads which snap onto the trousers or harness. An outer cover may be mounted to surround the bag to protect it against punctures and other damage.

3 Claims, 7 Drawing Figures

U.S. Patent     Aug. 1, 1978     4,103,645
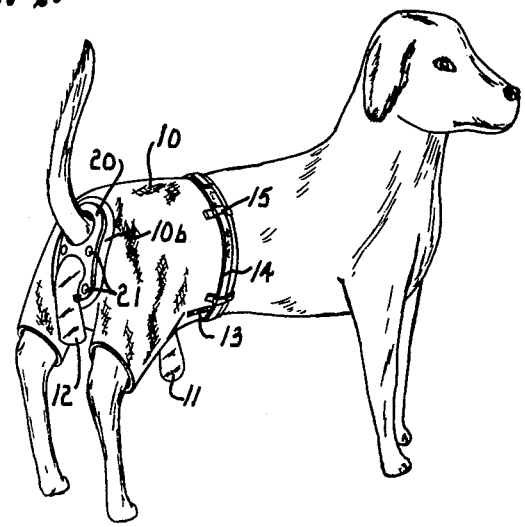
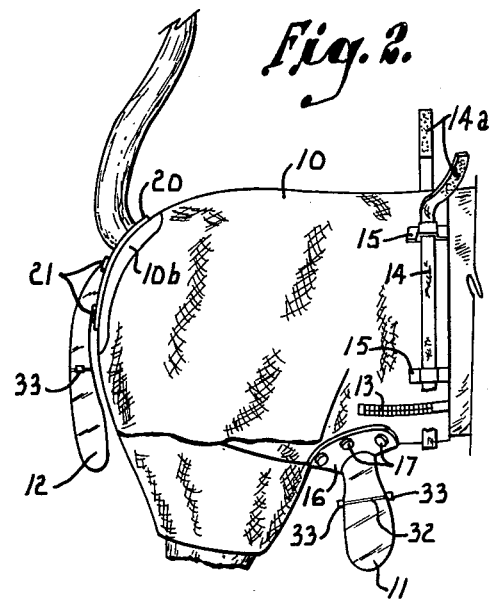
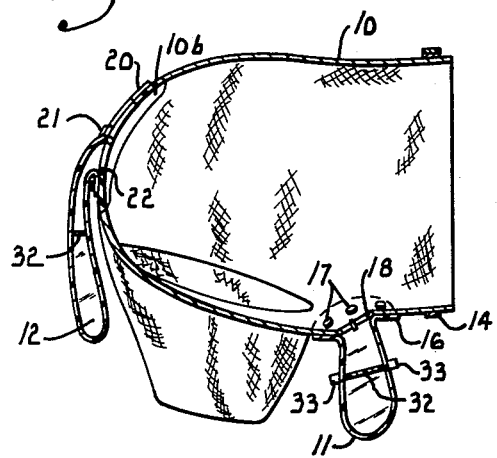
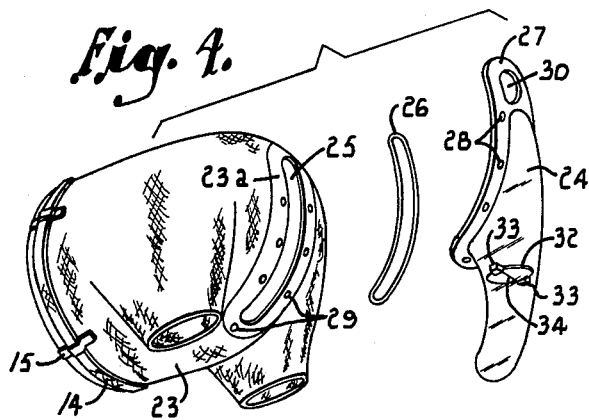
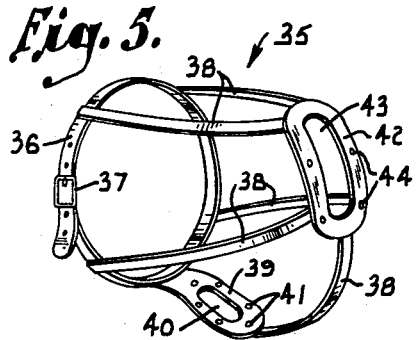
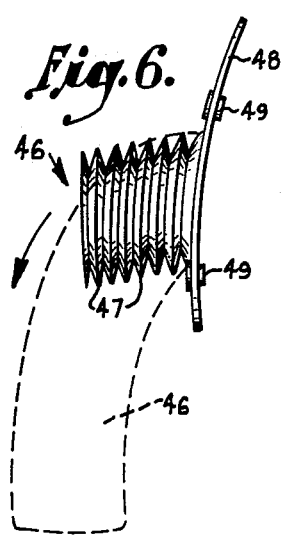
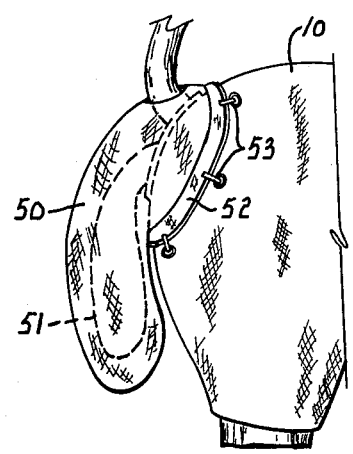

WASTE BAG FOR ANIMALS

BACKGROUND AND SUMMARY OF THE INVENTION

This invention relates to a waste bag for pets which facilitates the collection and disposal of waste material.

Written disclosures pertaining to the subject of this invention have previously been received by the Patent and Trademark Office as Disclosure Document No. 34992, Sept. 13, 1974; No. 43958, Sept. 29, 1974; No. 44740, Nov. 10, 1975; No. 50009, June 9, 1976; No. 51932, Aug. 24, 1976, No. 54115, Nov. 12, 1976; and No. 55820, Dec. 3, 1976.

It is the primary object of the invention to provide a waste bag which attaches to small animals such as dogs and other pets in order to receive their waste material.

Another object of the invention is to provide a waste bag arrangement which is attached to the body of the animal in a comfortable manner to avoid causing undue irritation or otherwise distrubing the animal as he moves about.

It is a further object of the invention to provide a waste bag of the character described which is disposable and which may be quickly and easily attached to and removed from the animal.

An additional object of the invention is to provide, in a waste bag arrangement of the character described, a sturdy outer cover for protecting the inner bag to shield it against punctures and other damage.

A still further object of the invention is to provide a waste bag arrangement of the character described that is constructed simply and economically.

Other and further objects of the invention, together with the features of novelty appurtenant thereto, will appear in the course of the following description.

DETAILED DESCRIPTION OF THE INVENTION

In the accompanying drawing which forms a part of the specification and is to be read in conjunction therewith and in which like reference numerals are used to indicate like parts in the various views;

FIG. 1 is a perspective view illustrating a first form of the invention applied to a small dog;

FIG. 2 is a side sectional view of the invention shown in FIG. 1;

FIG. 3 is a side sectional view of the invention shown in FIGS. 1 and 2;

FIG. 4 is an exploded perspective view illustrating an alternative form of the invention for use by a female animal;

FIG. 5 is a perspective view of a harness which may bw used to attach the waste bags to the animal;

FIG. 6 is a side elevational view of an alternative type of waste bag which is pleated in accordion fashion, with the broken lines indicating the expanded condition of the bag; and FIG. 7 is a fragmentary side elevational view of an outer cover that may be used to protect the inner waste bag which is shown in broken lines.

Referring now to the drawings in greater detail, FIGS. 1–3 illustrate trousers 10 by which a pair of flexible, water resistant waste bags 11 and 12 may be attached to the body of a male animal such as a dog or another small pet. The trousers 10 are preferably constructed of a flexible fabric, and they are sized to fit loosely over the rear legs and rear body portion of the animal, as shown in FIG. 1. To facilitate fitting the trousers on the animal, a slit is provided in the top of the trousers, and it may be closed by a zipper 13. A belt 14 having mating fasteners 14a on its ends may be passed through belt loops 15 and tightened to tighten the trousers around the midsection of the animal.

The trousers 10 are provided with three openings, one for bag 11, one for bag 12, and one for accommodating the tail of the animal. As shown in FIGS. 2 and 3, bag 11 connects with a mounting pad 16 which is provided with snap fasteners 17 that attach to mating fasteners located on a hard surface of the trousers in order to fasten bag 11 underneath the corresponding opening of the trousers in position to receive the urine. A circular gasket 18 (FIG. 3) which is preferably soft rubber is fit within the opening area of the trousers to provide a seal between the trousers and pad 16. As shown in FIG. 3, a thin rubber partition 19 is secured to extend across the gasket 18 at the upper portion of bag 11. The partition 19 assists in directing the waste material down into the bag rather than possibly having it deflect upwardly within the bag into contact with the body of the animal.

In a similar manner, bag 12 connects with a mounting pad 20 having snap fasteners 21 that connect with mating fasteners on a hard surface 10b of the trousers 10 in order to attach bag 12 in place on the animal to receive the feces. A circular gasket 22 is fit within the opening of the trousers to effect a seal between the trousers and pad 20.

Referring now to FIG. 4, alternative trousers 23 are provided to attach a single flexible bag 24 to a female animal. Trousers 23 fit loosely on the rear legs and body section of the animal and have a single elongated opening 25. A gasket 26 attached to waste bag 24 is fit within opening 25 to provide a seal between the trousers and the mounting pad 27 to which bag 24 is connected. Pad 27 has snap type fasteners 28 that mate with similar fasteners 29 mounted on a hard surface 23a of trousers 23 to connect bag 24 in place beneath opening 25. Pad 27 has an opening 30 through which the tail of the animal may extend.

Each waste bag is preferably provided with a disc 32 which serves essentially as a one way valve. With continued reference to FIG. 4, the disc is mounted within the bag at an intermediate location by means of small blocks 33 which connect with the periphery of the disc and with the bag 24. A slit 34 is formed through disc 32 such that waste material is able to pass downwardly through the disc due to its weight. The waste material located below the disc will be unable to pass upwardly through slit 34 in any appreciable quantity.

FIG. 5 illustrates a harness 35 which may be used instead of trousers to attach the waste bags to the body of the animal. The harness has a belt strap 36 which may be tightened around the midsection of the animal and secured by a buckle 37. A number of harness straps 38 extend from belt 36 along the body, and the lowermost strap 38 carries a pad 39 having an opening 40 and snap fasteners 41 to which the mounting pad of one waste bag may be fastened, with a gasket (not shown) preferably inserted in opening 40 to seal pad 39 against the pad of the waste bag. At their ends, straps 38 carry a pad 42 having an opening 43 and snap fasteners 44 to which the mounting pad of the other waste bag may be attached, with a gasket (not shown) inserted in opening 43.

FIG. 6 illustrates a waste bag 46 which may be employed as an alternative to the waste bags described previously. Bag 46 is initially arranged in accordion fashion with a number of pleats 47 such that the bag does not ordinarily hang downwardly to any great extent. The pleated arrangement of bag 46 causes it to expand as shown in broken lines when waste material is received. The top portion of bag 46 connects with a mounting pad 48 which is like the mounting pads described earlier. Pad 48 has snap fasteners 49 which connect with mating fasteners of the trousers or harness. Bag 46 acts in essentially the same manner as the bags described previously, and a gasket is used with it, along with a rubber partition when necessary.

FIG. 7 illustrates an outer cover 50 which may be used to protect an inner waste bag such as the bag 51 shown in broken lines. Bag 51 may be constructed like the bag 12 shown in FIGS. 1–3, and it may be connected with the trousers in the same manner. The cover 50 has an opening for receiving the tail of the animal and has a mounting ring 52 on its upper end which is provided with hook fasteners 53 by which the cover is attached to fasteners on the trousers. Cover 50 is constructed of much stronger material than bag 51, and the cover completely surrounds bag 51 to protect it against being punctured by the animal or otherwise damaged. Once the animal has become accustomed to wearing the waste bag, cover 50 will no longer be necessary in most cases. The cover may be removed simply by loosening fasteners 53. The cover 50 is more comfortable to the animal because it is sturdier and will not move around to any significant extent.

It is noted that each of the waste bags may be quickly and easily detached from the animal and discarded. Also, each bag may be attached to the animal either by means of trousers or the harness.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herein set forth or shown in the accompanying drawing is to be interpreted as illustrative and not in a limiting sense.

Having thus described the invention, I claim:

1. In a waste bag arrangement for animals such as dogs, the combination of:
    trousers adapted to fit on the rear legs and rear body portion of the animal, said trousers presenting at least one opening therethrough;
    means providing a relatively hard mounting surface on said trousers at a location substantially surrounding said opening;
    a bag for containing the waste material of the animal, said bag having an open end for receiving the waste material;
    a mounting pad secured to said bag at a location to substantially surround the open end thereof;
    mating fasteners on said mounting surface and pad adapted to releasably secure said pad against said surface, thereby positioning the bag to receive the waste material discharged by the animal;
    a disc member secured within said bag; and
    means presenting a slit through said disc member for passage of the waste material therethrough.

2. A combination as set forth in claim 1, wherein said mating fasteners are constructed to snap together.

3. A combination as set forth in claim 1, including a pair of mounting blocks secured to the periphery of said disc member and to said bag, thereby securing said disc member within the bag.

* * * * *